United States Patent

Young

[11] 4,206,839
[45] Jun. 10, 1980

[54] SAFETY LIFT APPARATUS FOR PORTABLE GRAIN ELEVATORS AND THE LIKE

[76] Inventor: Wendell M. Young, Berlin, N. Dak. 58415

[21] Appl. No.: 817,156

[22] Filed: Jul. 20, 1977

[51] Int. Cl.² ............................................. B65G 43/00
[52] U.S. Cl. .................................. 198/301; 198/316; 198/320
[58] Field of Search ............... 198/318, 319, 320, 862, 198/502, 507, 524, 301, 315, 316; 214/17 A, 17 C, 17 CA, 17 CB, 17 CC; 193/15

[56] References Cited

U.S. PATENT DOCUMENTS

| | | | |
|---|---|---|---|
| 1,417,096 | 5/1922 | Mueller | 193/15 |
| 2,615,560 | 10/1952 | Robinson | 198/320 |
| 2,646,157 | 7/1953 | Belt | 198/320 |
| 2,778,477 | 1/1957 | Lundahl | 198/314 |
| 2,794,538 | 6/1957 | Schenk | 198/862 X |
| 2,964,158 | 12/1960 | Wells | 198/316 X |
| 3,092,239 | 6/1963 | Mayrath | 198/320 |
| 3,153,489 | 10/1964 | Leavengood et al. | 198/315 X |
| 4,054,213 | 10/1972 | Chever | 198/301 X |

Primary Examiner—Robert B. Reeves
Assistant Examiner—Douglas D. Watts
Attorney, Agent, or Firm—Young & Martin

[57] ABSTRACT

Lift apparatus is adapted for raising and lowering portable grain elevators and the like and includes both a power lift mechanism and an alternative manual lift mechanism. It also includes an upper limit stop for limiting the height to which the power lift mechanism can raise the elevator and a tie-down limit stop for tying the raised end of the elevator to an anchoring object for safety in addition to prohibiting the power lift mechanism from operating when the elevator is so anchored. In the disclosed embodiment, an elevator lift apparatus which includes a cable for drawing a front frame member toward a rear frame member to effect raising the rear end of a grain elevator is provided on one end with a power driven winch for drawing the cable to effect lifting, and it is also provided on its opposite end with a manual winch for also drawing the cable to effect lifting. A hydraulic fluid flow circuit is provided to supply the hydraulic motor with fluid, said circuit having an alternative one-way directional flow route for bypassing the hydraulic motor on the power lift mechanism. An upper limit stop means which is mechanically sensitive to the position of the lifting apparatus at the desired maximum limit of lifting range for actuating said valve to bypass the flow of hydraulic fluid around the hydraulic motor. A second alternative circuit is also provided to allow hydraulic fluid to flow in a reverse direction through the hydraulic motor to begin lowering the elevator to a position in which the valve is deactuated, restoring the system to the normal fluid flow route. The tie-down mechanism is also connected to the valve and has enough travel to actuate the valve to bypass the motor but is limited in travel such that the anchoring force is transferred to the upper end of the elevator for tie-down purposes. Alternative embodiments include free hanging weighted bodies to sense the maximum desired height to which the elevator is raised and to actuate the bypass valve mechanism.

17 Claims, 17 Drawing Figures

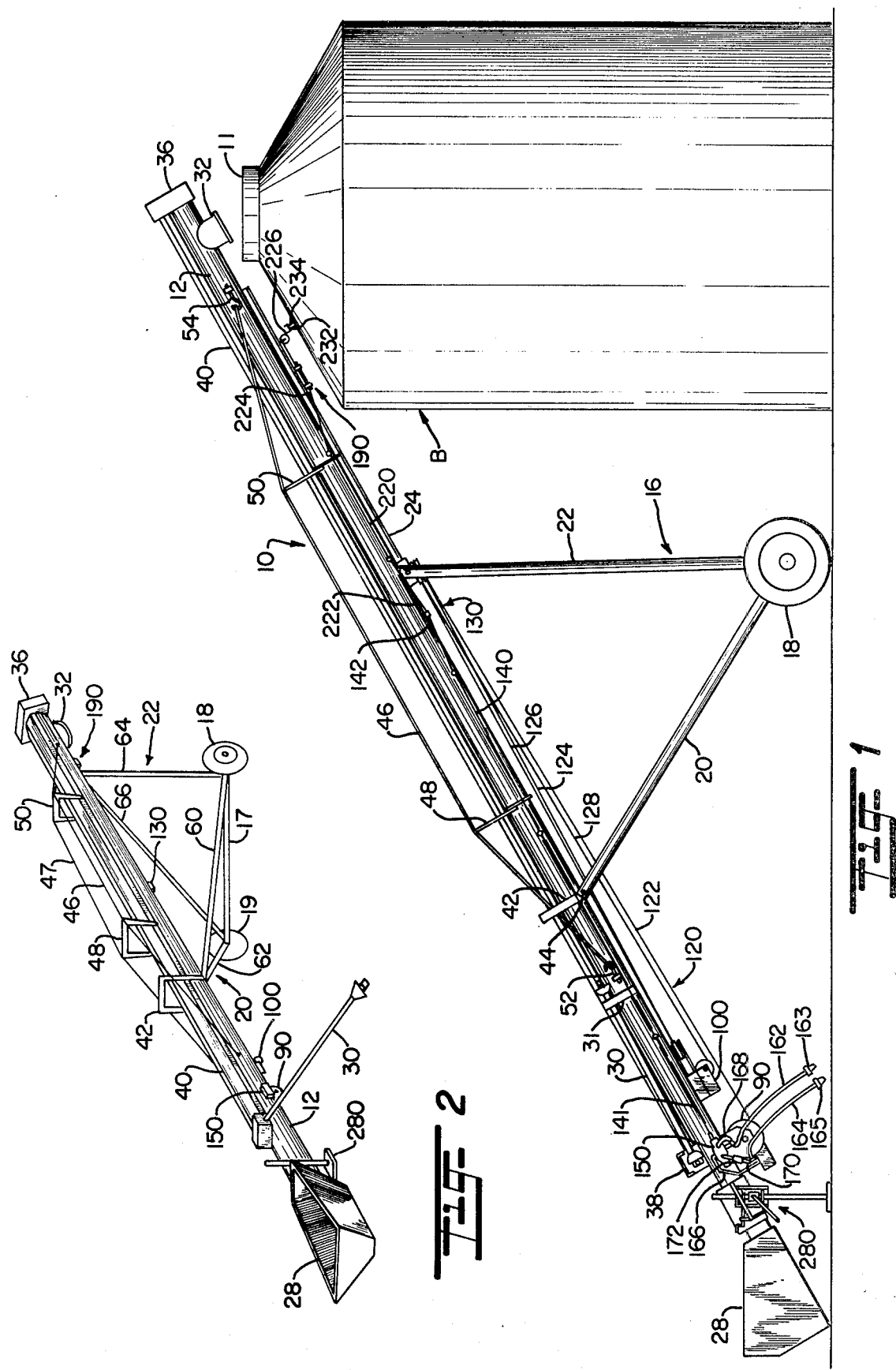

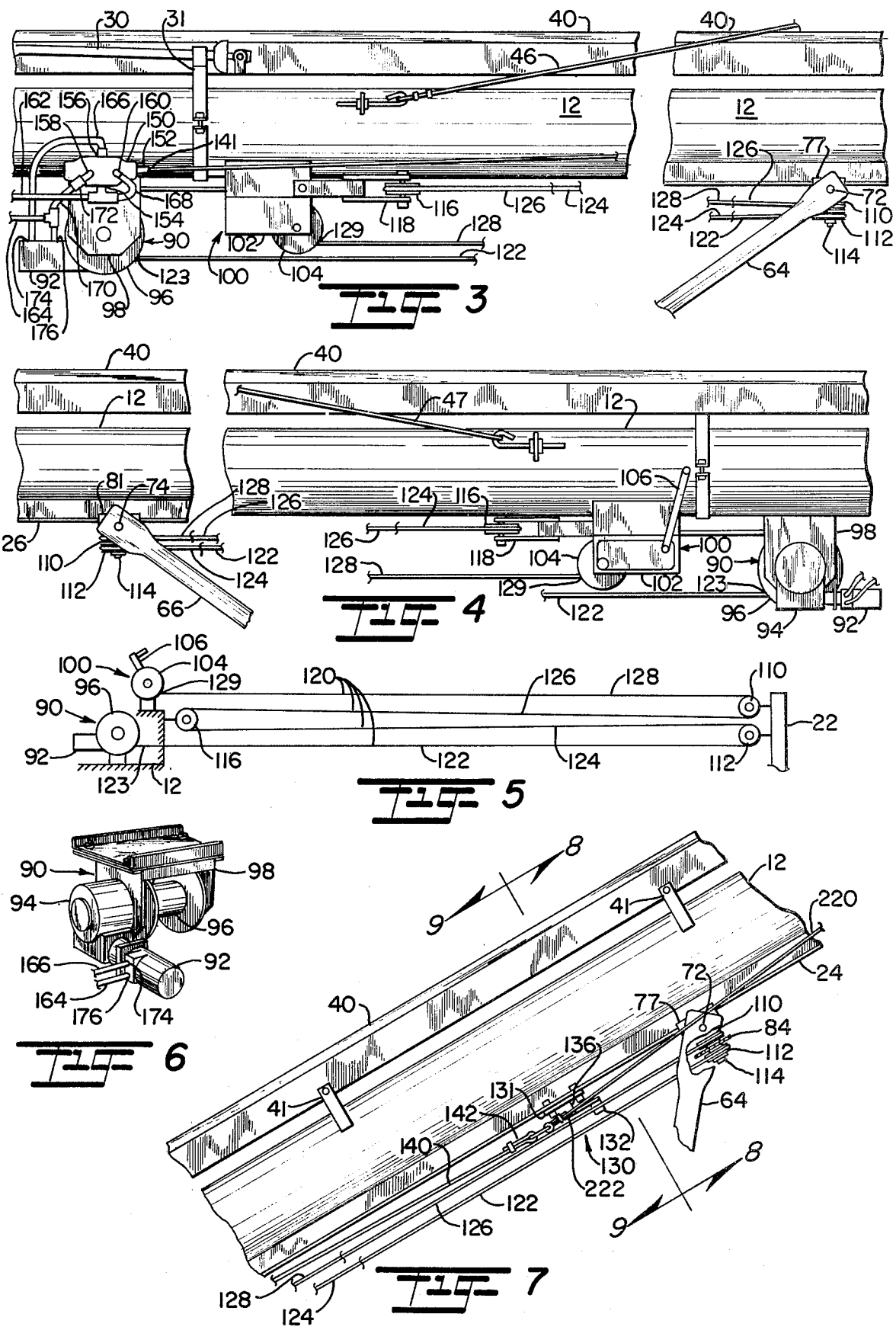

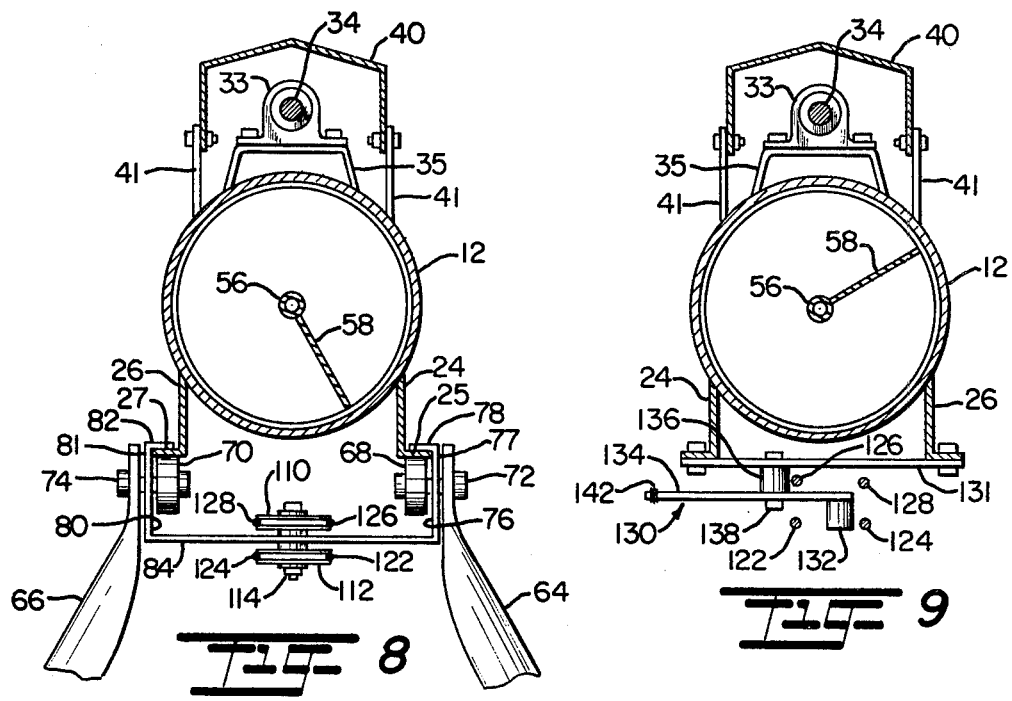

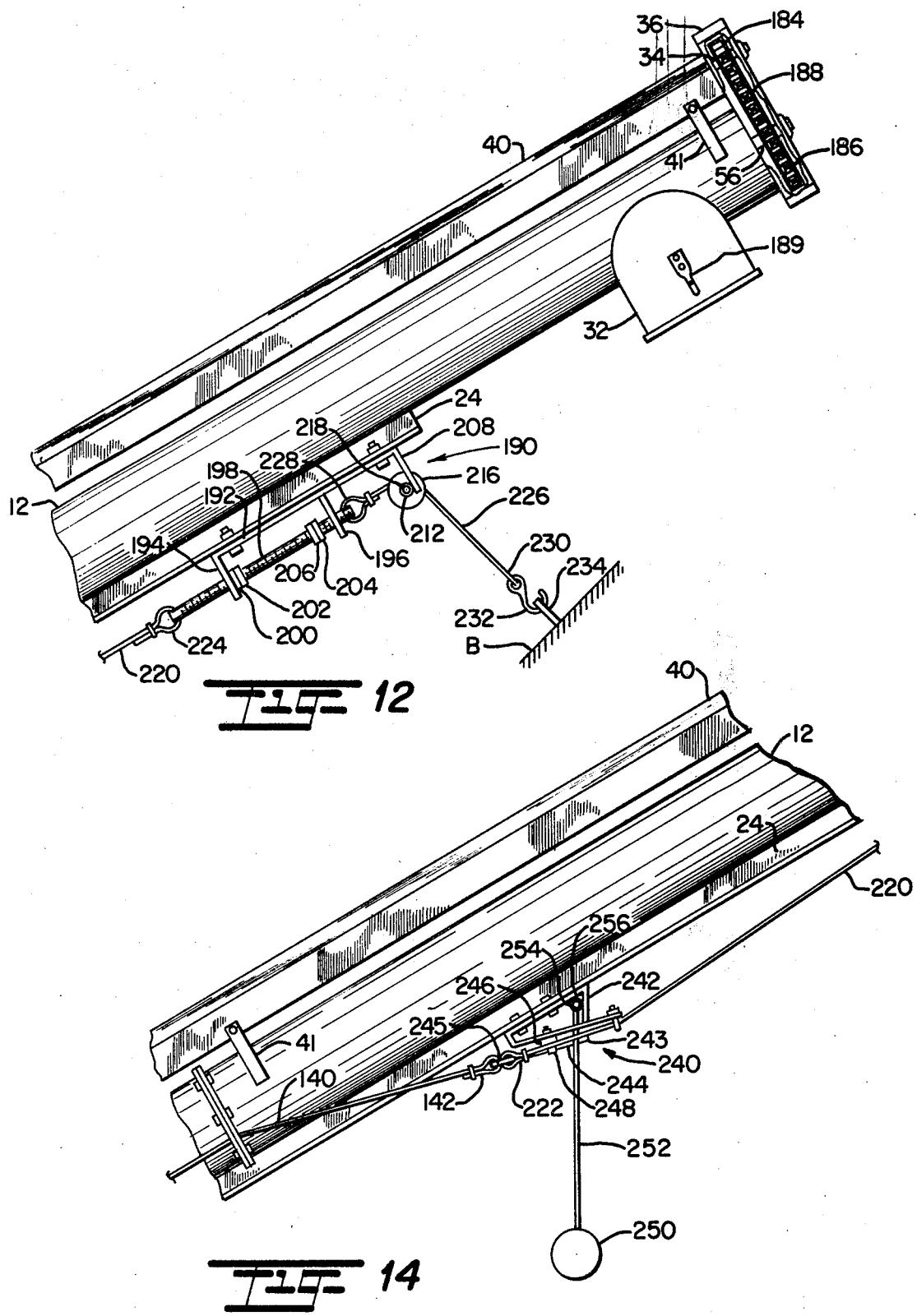

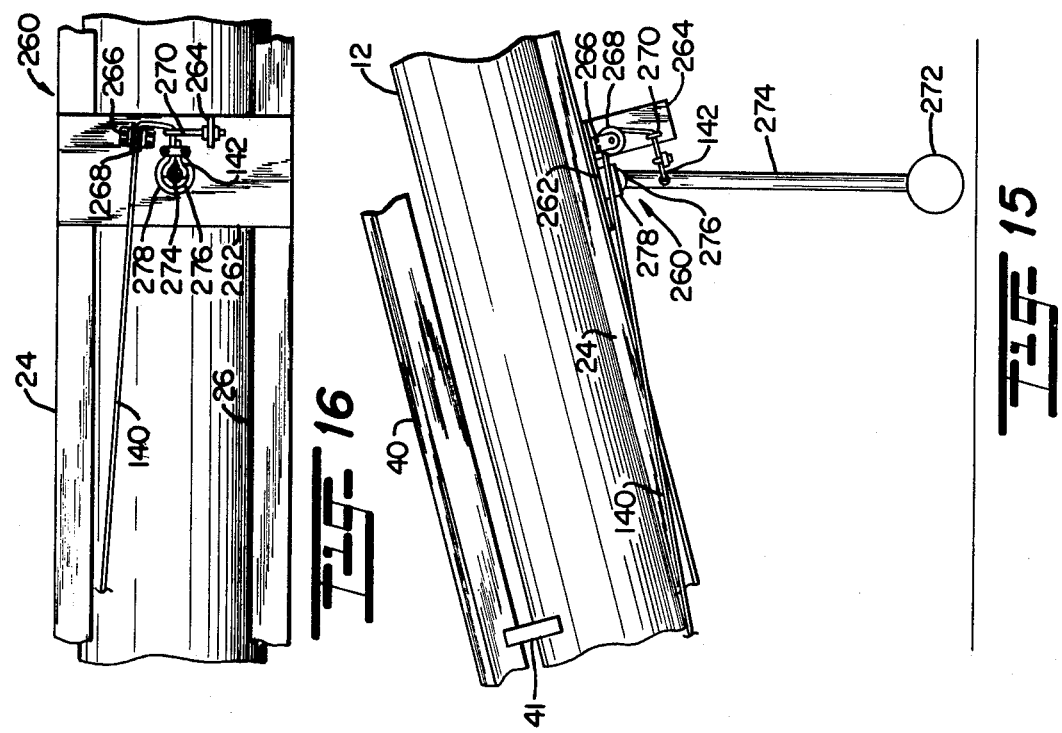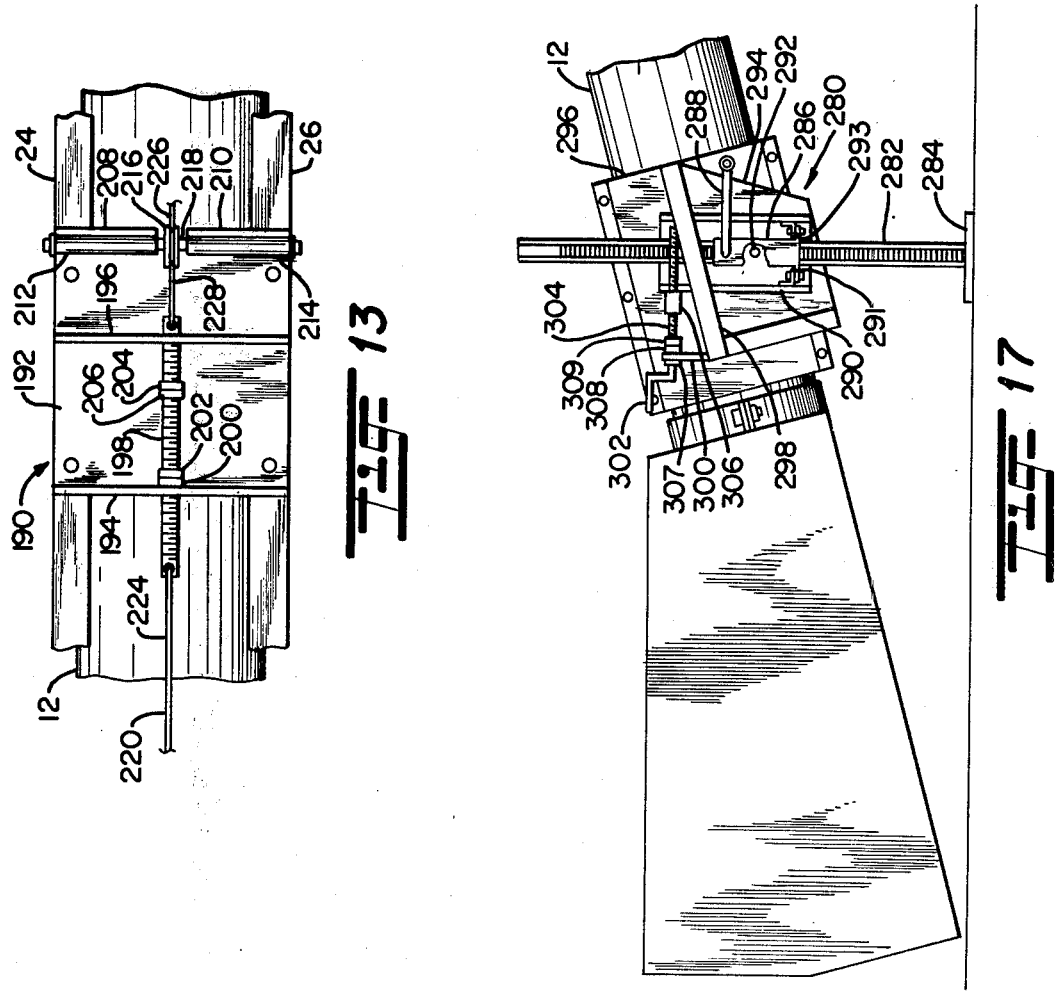

SAFETY LIFT APPARATUS FOR PORTABLE GRAIN ELEVATORS AND THE LIKE

BACKGROUND OF THE INVENTION

The present invention relates generally to apparatus for lifting machinery and more particularly relates to safety lift apparatus for portable grain elevators.

Portable grain elevators have been used for many years as a convenient mechanism for transferring grain from near ground level to the tops of graineries for filling grain bins therein. Until recently, most grain bins were not very high, and elevators for elevating the grain into those bins were of a managable size. Consequently, a totally manual lift mechanism was satisfactory for raising the rear end of an elevator from a storage and transfer position near the ground to a position high above the ground over the top of a grain bin. A conventional manual lift mechanism for raising the rear end of the elevator included a pivotal attachment of the lower end of an elevator to a stationary carriage assembly and a strut pivotally attached to the stationary carriage assembly and extending into longitudinally movable contact with the elevator. A cable was connected to the strut on one end and onto a manually operated winch on the other end. By manually operating the winch to wind the cable around a reel, the strut was drawn longitudinally forwardly along the elevator resulting in raising the rear end of the elevator to the desired height.

In recent years, the use of much larger and higher grain bins plus the desire for grain elevators having much larger grain carrying capacities has resulted in the demand for significantly larger grain elevators which are both much longer and much larger and heavier than the elevators common in years past. Once set up, these longer and larger elevators are capable of transferring grain into higher bins at considerably increased rates; however, they are much more cumbersome and difficult to manipulate, position and set up. Therefore, it is desirable to utilize a power lift mechanism for raising the rear end of an elevator to the desired height over a grain bin, and it is preferable that such mechanism be operable from the seat of a tractor or other vehicle to which the elevator is attached so that it can be simultaneously raised and moved backward into position over the grain bin. Indeed, some persons skilled in the art have substituted hydraulically powered winches on the ends of the lift cables in place of the conventional manual winches for raising elevators.

These powered systems, while basically accomplishing the purpose of making it more convenient to raise the elevator to the desired height, have also resulted in some significant problems. For example, the power lift can be a safety hazard if operated by inexperienced or inattentive persons who allow the mechanism to lift the elevator to unsafe heights. The structure of the carriage and lift apparatus of most elevators is such that if the lift apparatus is allowed to travel too far, the center of gravity of the elevator may become positioned to the rear of the supporting apparatus causing the elevator to topple with the rear end falling to the ground from a considerable height while the front end suddenly vaults high into the air. Such a situation can occur without warning and can cause severe injury to persons near the elevator and severe structural damage to the elevator itself.

Also, because the grain bins for which such elevators are commonly used are quite high and the elevators become somewhat more unstable when raised to such heights, it is common practice, once the elevator is in position over the grain bin, to tie the upper end of the elevator to the top of the grain bin to anchor it to prevent it from tipping in case of high winds or other adverse conditions. Such a tie-down anchor, while being a considerable safety advantage to keep the elevator from tipping, also resists further raising of the rear end of the elevator. Therefore, if the operator should attempt to raise the elevator, for example, to remove the down spout of the elevator from the filler hatch on top of the bin, but forgets to unfasten the anchoring tie-down, severe structural damage could occur to both the elevator and the bin and could result in the elevator collapsing and injuring persons in the vicinity. While such an eventuality is unlikely with a manually operated winch because the operator could feel the resistance of the anchoring cable, it could quite easily happen with a powered winch. Consequently, the safety concern of most manufacturers as well as governmental regulations have generally inhibited the wide spread use of the more convenient power lift mechanisms on large elevators.

Another problem which has arisen from elevators equipped with power lift mechanisms is that while it is generally contemplated that a necessary power source such as a tractor with a hydraulic system for those mechanisms powered by hydraulic fluid will be available when the elevator is used, there are occcasions in which a tractor with a hydraulic system is unavailable. Yet the operator may desire to operate the elevator with another vehicle such as a jeep or tractor which does not have the appropriate power source necessary to raise the elevator. In these circumstances, it is very desirable to be able to alternatively raise the elevator with manual means even though such manual raising means may not be as convenient as the powered lift means.

SUMMARY OF THE INVENTION

Therefore, it is an object of the present invention to provide powered lift means for raising the rear end of a grain elevator which includes upper limit stop means for preventing the elevator from being raised beyond a certain predetermined safe height.

It is also an object of the present invention to provide a powered lift mechanism for an elevator including a tie-down limit stop means for both tying the upper end of an elevator to an anchor and to limit the operation of the lift means from acting to raise the elevator beyond the height at which it is tied.

Another object of the present invention is to provide powered lift apparatus in combination with a manual lift apparatus for a grain elevator, either of which can be used alternatively to raise the elevator without disabling the other.

Still another object of the present invention is to provide hydraulically powered lift means for raising machinery including upper limit stop means sensitive to a position of an upper maximum limit and operative to actuate valve means connected to a bypass system for interrupting the flow of hydraulic fluid to the hydraulic lift means and bypassing it back to the source of hydraulic fluid flow.

A still further object of the present invention is to provide upper limit stop means as described above wherein the bypass system accommodates fluid flow in only one direction and which includes still another alternative fluid flow circuit route which allows a reverse flow of fluid through the hydraulic motor to initiate lowering the elevator until the upper limit stop means is no longer actuated and the valve means is allowed to return to its normal circuit position.

A still further object of the present invention is to provide a jack means for lifting the front end of an elevator to a height at which it can be attached to a vehicle for pulling, which jack means includes adjustable tilting means for adjustably orienting said jack means vertical to the ground regardless of the raised or lowered position of the rear end of the elevator.

The present invention is directed to a novel improvement in powered lifting means for conventional grain elevators and other machinery and to novel safety limit stop means for limiting the maximum height to which powered lift means on elevators and other machinery is allowed to raise the elevator or other machinery. The powered lift means disclosed in the present invention includes a power winch attached to one end of the lift cable of a conventional lifting apparatus of a grain elevator in addition to a manually operated winch attached to the opposite end of the lift cable. The powered winch is driven by a hydraulic motor. The hydraulic motor is energized by a flow of hydraulic fluid through a closed circuit from a hydraulic pumping source such as a conventional double acting, reversible flow hydraulic system of a tractor. A flow of hydraulic fluid in one direction causes the hydraulic motor to turn the winch to draw or wind the cable onto its reel to raise the elevator, and the flow of hydraulic fluid in a reverse direction through the motor causes the motor to turn in the opposite direction resulting in the winch allowing the cable to unwind off its reel to lower the elevator. The manual winch at the opposite end of the cable also operates in a similar manner to raise and lower the elevator by winding the cable onto its reel and alternatively allowing the cable to unwind from its reel, respectively.

Valve means is provided in the hydraulic circuit in addition to a bypass circuit such that when the valve means is actuated, the fluid is diverted from its normal flow path and through the bypass circuit to bypass the hydraulic motor thereby allowing circulation of the fluid in a complete circuit from the tractor hydraulic system, but precluding the operation of the hydraulic motor. An upper limit stop means is positioned on the elevator at a location in which it will be contacted by a moving component of the lifting apparatus of the elevator when it reaches a predetermined maximum height. When the limit stop is contacted by the component of the lift mechanism, it causes the valve means to be actuated resulting in the hydraulic fluid being diverted through the bypass circuit thereby stopping further rotation of the hydraulic motor and hydraulically powered winch thereby also precluding any further raising of the elevator.

When the lift mechanism of the elevator is stopped at the maximum height limit with the valve means in the bypass mode, a reverse flow of hydraulic fluid from the source or hydraulic system of the tractor would also simply flow in a reverse direction through the bypass and be incapable of turning the motor in a reverse direction to lower the elevator. It would in effect be stuck on a dead spot not being capable of further raising or lowering. Therefore, one-way check valve means is provided in the bypass circuit to prohibit reverse flow of fluid through the bypass, and an alternative flow circuit is provided to accommodate reverse flow of fluid from the tractor hydraulic system through the hydraulic motor and through the alternative circuit until the elevator is lowered a sufficient amount to remove the contacting component of the lift apparatus from the upper limit stop thereby allowing the valve means to be deactuated and returned to the normal mode in which hydraulic fluid can continue flowing in the reverse direction in the normal circuit through the motor and back to the tractor hydraulic system to continue lowering the elevator.

The invention also includes a tie-down limit stop near the rear end of the elevator which serves both to tie down or anchor the raised end of the elevator to a solid object such as the top of a bin to prevent it from being toppled by wind or other adverse conditions. The tie-down limit stop also actuates the valve means to divert the flow of fluid through the bypass thereby precluding the power lift mechanism from operating against the restraining force of the tie-down at the rearward or upper end of the elevator. The tie-down limit stop includes a bracket near the rear end of the elevator having a shaft slidably mounted therein with collars thereon for limiting the sliding movement of the shaft. A tie-down cable is attached to the rear end of the shaft, passed over a sheave, and anchored at its opposite end to a solid object as the roof of the bin over which the elevator is positioned. Another cable is attached to the opposite end or forward end of the shaft and extends to the valve means with its opposite end attached thereto. Therefore, when hydraulic fluid is circulated through the hydraulic motor in a direction to raise the elevator when the rear end of the elevator is tied to the bin, the anchoring cable acting through the shaft, slides the shaft forward, pulling with it the cable connected to the valve means, a sufficient distance to actuate the valve means to divert the flow of hydraulic fluid through the bypass circuit; however, the collar on the shaft then contacts the bracket prohibiting further sliding movement of the shaft and thereby providing an immovable connection to the rear end of the elevator to effectively tie the rear end of the elevator to the bin without applying excessive force on the valve means.

In two described alternative embodiments of this invention, the upper limit stop includes a suspended weight in the form of a pendulum attached to the elevator and connected to the valve. When the rod suspending the weight deviates a predetermined angle from the elevator corresponding to a predetermined maximum height of the elevator, the pendulum actuates the valve means to divert the flow of hydraulic fluid through the bypass circuit. A pendulum can also actuate the valve means when it deviates an angle transverse to the elevator indicating a list or tipping condition of the elevator.

The invention also includes the additional feature of tiltable jack means mounted on the forward end of the elevator for lifting the forward end to a height necessary to attach the elevator to a vehicle for moving, said jack means being tiltable to adjust its angle to the elevator as necessary to maintain it in substantially verticle orientation to the ground throughout the range of raising and lowering the rear end of elevator.

DETAILED DESCRIPTION OF THE DRAWING

Other objects, advantages and capabilities of the present invention will become more apparent as the description proceeds taken in conjunction with the accompanying drawings in which:

FIG. 1 is an elevation view of a grain elevator equipped with the lift apparatus of the present invention shown in a raised position over a grain bin, the lowered position of the elevator being shown in phantom lines to illustrate the relative movement of the components of the carriage and lifting apparatus of the elevator;

FIG. 2 is a perspective view of the elevator primarily illustrating the inverted "V"-shaped front and rear frame members of the conventional carriage and lifting apparatus of an elevator;

FIG. 3 is a fragmented elevation view of the side of the elevator showing the forward portion of the elevator at which location the hydraulically powered winch and the manually operated winch are operated and the portion in the center where the rear frame member is movably attached to the underside of the elevator tube;

FIG. 4 is a elevation view showing substantially the same apparatus as illustrated in FIG. 3 except from the opposite side of the elevator;

FIG. 5 is a schematic diagram of the lift cable, sheaves, and the powered and manually operated winches;

FIG. 6 is a perspective view of the hydraulically powered winch isolated from the elevator for clarity;

FIG. 7 is a side elevation view of the center portion of the elevator illustrating the rear "V"-shaped frame member slidably approaching the upper limit stop when the elevator is in nearly maximum raised position;

FIG. 8 is a sectional view of the movable attachment of the rear frame member to the elevator tube taken along the line 8—8 in FIG. 7;

FIG. 9 is a sectional view of the elevator illustrating the upper limit stop mechanism taken along the line 9—9 in FIG. 7;

FIG. 10 is a bottom plan view of the center section of the elevator illustrating the rear frame member slidably approaching the upper limit stop mechanism, the position of the upper limit stop mechanism upon being contacted by the sheave attached to the rearward frame member wherein the valve means is actuated being shown in phantom lines;

FIG. 11 is a schematic diagram of the hydraulic circuit of the present invention;

FIG. 12 is an elevation view of the rearward end of the elevator illustrating the tie-down limit stop apparatus;

FIG. 13 is a bottom plan view of the tie-down limit stop mechanism shown in FIG. 12;

FIG. 14 is an elevation view illustrating an alternate embodiment of the upper limit stop means including a suspended weighted body acting against a pivotally mounted lever to actuate the valve means;

FIG. 15 is an elevation view of still another alternate embodiment including a suspended weighted body mounted in a ball socket under the elevator and connected by a cable to the valve means;

FIG. 16 is a bottom plan view of the apparatus shown in FIG. 15 with the weighted body removed for clarity; and FIG. 17 is an elevation view of the forward end of the elevator showing the tiltable jack means.

DESCRIPTION OF THE PREFERRED EMBODIMENT

A conventional state-of-the-art grain elevator 10 equipped with the power lift apparatus of the this invention is shown in FIG. 1 in raised position over a grain bin B as it would be for transferring grain from a near ground location to the filling hatch 11 at the top of the grain bin B. Although it forms no part of this invention apart from this disclosure, the conventional elevator 10 will be described in some detail to enhance understanding of this invention.

Referring to FIGS. 1, 2, 8, 9 and 12, the portable grain elevator 10 is comprised of an elongated tube 12 with an auger 14 positioned therein having helical flighting 58 continuously spiraled around a shaft 56 throughout the length of the auger for transferring grain longitudinally through the tube 12. The elevator is supported by a carriage assembly 16 which includes a forward frame member 20 in the shape of an inverted "V" pivotally attached to a mounting bracket 42 over the tube 12 just forward of its midsection. The carriage structure 16 also includes a rear frame member also in the shape of an inverted "V", a transverse axle 17, and two wheels 18, 19 mounted on opposite ends of the axle.

As best seen in FIGS. 1 and 2, the front frame member, which is in the form of an inverted "V" has two legs 60, 62, each being pivotally attached to the mounting bracket 42 by pins 44. The base of the front frame member 20, defined by the opposite ends of each leg 60, 62, respectively, is pivotally attached at opposite sides of the transverse axle 17.

The rear frame member 22 is similarly in the form of an inverted "V" having two legs 64, 66, the base of which is also pivotally attached opposite ends of the axle 17. The upper end of the rear frame member 22 is movably mounted under the tube 12 such that it can move longitudinally with respect to the axis of tube 12 toward and away from the pivotal connection of the front frame member 20 to the mounting bracket 42. A lift cable 120 connected to the upper end of the rear frame member 22 draws the rear frame member 22 toward the front frame member 20 causing the rear end of the elevator to raise. This principle is best illustrated in FIG. 1 wherein the phantom lines show the elevator 10 in lowered position with the upper ends of the respective frame members 20, 22 a substantial distance apart. However, as the upper end of rear frame member 22 is drawn by cable 120 toward the front frame member 20, the rear end of the elevator is raised as shown in FIG. 1.

The movable attachment of the upper end of rear frame 22 to the underside of the tube 12 is best seen in FIGS. 3, 4, 7, 8, and 10. Two guide tracks 24, 26 extend downwardly from opposite sides of tube 12. Each track has an outwardly turned lip 25, 27, respectively. The upper end of each leg 64, 66 of the rear frame member 22 is flattened, and bolts 72, 74, respectively, are inserted through each flattened portion. A roller 68, 70 is journaled on each bolt 72, 74, respectively, directly under the lips 25, 27, respectively, of guide tracks 24, 26. These rollers 68, 70 support the weight of the rearward portion of the elevator 10 while allowing the upper end of the rear frame member 22 to move longitudinally forward and backward with respect to the axis of the tube 12 to effect raising and lowering of the rear end of the elevator. A guide 76 is also mounted on bolt 72 with its vertical plate 77 adjacent and spaced slightly outward from roller 68 to maintain the guide track 24 in proper alignment with roller 68. The upper end of guide 76 has a lip 78 turned inwardly from the vertical plate 77 in radially spaced relation over the roller 68 and over the outwardly protruding lip 25 of guide track 24 to prevent the tube from raising or jumping upwardly in relation to the roller 68. A similar guide 80 is mounted on bolt 74 in slightly outwardly spaced relation to roller 70, said guide 80 also having a verticle portion 81 and an inwardly turned lip 82 in radially spaced relation to the roller 70 to accomodate therein and maintain in proper alignment the lip 27 of guide track 26 in relation to the roller 70. The two guides, 76, 80 are rigidly fastened together and to enhance stability by a cross plate 84.

The plate 84 also serves as a mounting for two sheaves 110, 112 journaled on bolt 114 which extends through plate 84 for accomodating the lift cable 120 which moves the upper end of rear frame 22 in relation to the tube 12 to raise and lower the rear end of the elevator as described above.

The auger 14 is conventionally driven by a power source such as a tractor power take-off through power take-off shaft 30. In FIG. 1, the power take-off shaft 30 is shown in a storage position supported by a stirrup 31. In FIG. 2, the power take-off shaft 30 is shown in extended position transverse to the longitudinal axis of the auger in a position ready to be connected to a tractor power take-off. The power take-off shaft 30 is connected to and turns a drive shaft 34 through a 90° gear box 38 having a set of intermeshed bevel gears therein. The drive shaft 34 extends longitudinally the entire length of the elevator to its rearward end in spaced apart relation over the tube 12. At several intervals along the length of the elevator the drive shaft 34 is journaled in bearing blocks 33 supported over the tube 12 by support brackets 35. A shield 40 supported by struts 41 is placed over the drive shaft 34 along the entire length of the elevator for safety. At the rear end of the elevator, as best seen in FIG. 12, a sprocket 184 is mounted on drive shaft 34, and a sprocket 186 in alignment with sprocket 184 is mounted on auger shaft 56. A roller chain 188 passes over both sprockets 184, 186 through which drive shaft 34 imparts rotation to auger shaft 186. The sprockets 184, 186 and roller chain 188 are enclosed for safety in a housing 36 fastened to the rear ends of tube 12 and shield 40. A down spout 32 is also provided at the rear end of tube 12 to allow the grain being elevated through the tube 12 by auger 14 to flow out of the tube 12 and into the filling hatch 11 on the top of bin B. Hooks 189 for suspending an extension on the down spout 32 are provided when a longer down spout is desired.

A hopper 28 on the foward end of the elevator 10 is mounted on tube 12. Grain is initially dumped into the hopper 28, for example, from a truck box for elevating into the bin B. The auger 14 extends forwardly from the tube 12 into the hopper 28 to initially contact the grain and pull it into the tube 12 for transferring to the filling hatch 11 of bin B. Also, to complete the description of the conventional elevator, a truss system is provided to give additional support to the tube 12 of the longer, larger elevators. The truss system includes two truss struts 48, so extending upwardly over the tube 12 in spaced apart relation to each other, and truss cables 46, 47 are anchored at each end to the tube 12, for example, at 52, 54 for cable 46, and extend in a tensioned condition over the truss struts 48, 50. This truss structure resists the tendency of the long tube 12 to bow upwardly in the middle portion due to the weight of the extended portions of the tube over the supporting or carriage structure 16.

The cable lift apparatus, including the hydraulically powered winch and the manual winch of this invention is best seen in FIGS. 1 and 3 through 8. Specifically, FIG. 5 is a schematic diagram illustrating the cable lift mechanism. The hydraulically powered winch 90 is immovably attached to the elevator structure such as to the underside of the tube 12. The manual winch 100 is also immovably attached to the elevator structure such as to the underside of the tube 12. As already described above, two sheaves 110, 112 are attached to the upper end of rear frame member 22. One additional fair lead sheave 116 is also anchored to the tube 12 in the vicinity of the powered and manual winches. The lift cable 120 is attached at one end 123 to the reel 96 of power winch 90. A first portion of 122 of the cable 120 extends longitudinally in relation to the tube 12 to the upper end of rear frame member 22 where it passes over sheave 112, then a second portion 124 of the cable 120 returns longitudinally along the tube 12 to the fair lead sheave 116 where it passes over fair lead sheave 116, a third portion 126 of the cable 120 again extends longitudinally along the tube 12 to the upper end of frame member 22 where it passes over sheave 110, and a fourth portion 128 again returns longitudinally along the tube 12 to the manual winch 100 where the opposite end 129 of cable 120 is attached to the reel 104 of manual winch 100. This cable and sheave arrangement, of course, provides a mechanical advantage which is important primarily when the elevator is being raised by use of the manual winch 100.

When the elevator is raised with the power winch 90, the reel 104 of manual winch 100 is locked against rotation and acts as a dead end connection for anchoring the opposite end 129 of cable 120. Therefore, the cable is drawn to and wound around spool 96 of power winch 90 which results in the upper end of rear frame member being drawn forwardly along the underside of tube 12 toward the pivotally anchored front frame member 20 to raise the rear end of the elevator as described above.

Alternatively, when a hydraulic system is not available for powering the winch 90, the manual winch 100 can be used to raise the elevator. In these circumstances, the reel 96 of power wench 90 is restrained from rotation so that is functions as a dead end connection for anchoring the first end 123 of cable 120. The manual winch 100 is operated by turning crank 106 which through a gear train imparts rotation to reel 104 resulting in drawing the cable 120 toward and winding it around the reel 104 causing the upper end of the rear frame member 122 to move forwardly along the underside of tube 12 toward the pivotally mounted front frame member 20 to raise the elevator.

The manual winch is shown in FIGS. 3 and 4 with its reel 104 journaled in a frame 102 which also contains an appropriate gear train (not shown) through which crank 106 is mechanically connected to reel 104. The manual winch 100 is mounted on the elevator with its frame 102 attached to the underside of tube 12. The sheave 116 is journaled in a fair lead yoke 118 attached to and extending forwardly from the frame 102 of manual winch 100.

The power winch is illustrated in FIGS. 3, 4 and 6. It includes a spool 96 journaled in a frame 98 which is attached to the underside of tube 12. The power winch 90 is driven by a hydraulically powered motor 92 through a conventional worm and gear arrangement (not shown) located within gear housing 94. Hydraulic fluid is supplied to the hydraulic motor 92 through hydraulic lines 164, 166 connected to ports 176, 174, respectively. The hydraulic motor 92 is reversible so that flow of hydraulic fluid in one direction causes the motor shaft to rotate in one direction, and reverse flow of the fluid in the opposite direction causes the motor shaft to rotate in the opposite direction. Therefore, by controlling the direction of flow of the hydraulic fluid through the motor, the elevator can be either raised or lowered by either winding the cable 120 onto the reel 96 or allowing the cable 120 to be unwound off the reel 96. The hydraulic fluid is supplied by a pumping source such as the hydraulic system of a tractor which conventionally has the capability of supplying a continuous flow of hydraulic fluid in either a forward or reverse direction as selected by the operator.

Because raising the elevator with the power winch 90 is relatively effortless, it is necessary to provide a means for limiting the maximum height to which the elevator can be raised in order to preclude the safety hazards discussed above which may result from raising the elevator too high by an inexperienced or inattentive operator. The upper limit stop means must be capable of stopping further lifting of the elevator while not endangering the structural or mechanical integrity of the lifting apparatus. The upper limit stop 130 of this invention is positioned under the tube 12 as shown in FIG. 1 directly in the path of travel of the upper end of rear frame member 22 at a position along the length of the tube which is predetermined to allow a maximum safe lifting range.

The structure of the limit stop 130 is illustrated in more detail in FIGS. 7, 9 and 10. It includes a lever or arm 134 pivotally mounted on a bolt 138 near its mid section under the tube 12, one end of said lever 134 having an enlarged bumper 132 mounted thereon, and a cable 140 is connected to the opposite end of the lever 134. A mounting plate 131 is attached to the guide tracks 24, 26 of the tube 12, and a spacer sleeve 136 is provided around the bolt 138 between the lever 134 and mounting plate 131 to maintain a spaced distance therebetween to preclude any interference with the pivoting movement of the lever 134. As best seen in FIGS. 8, 9 and 10, the bumper 132 is in direct alignment with the sheaves 110, 112. Consequently, as the upper end of rear frame member 22, including the sheaves 110, 112, is drawn forwardly by the lift cable 120, the sheaves 110, 112 will ultimately contact the bumper 132 on lever 134 causing the lever 134 to pivot to the position shown in the phantom lines in FIG. 10. As will be described below, such movement of lever 134 deactivates the power lift means so that further raising of the elevator by the power lift means is precluded.

The apparatus of this invention is designed to deactivate the power winch 100 without causing damage due to high pressures or to require excessive use of the conventional pressure relief means in the hydraulic system of a tractor. A distribution valve 150 shown in FIGS. 1, 3 and 11 is provided to divert the flow of hydraulic fluid through a bypass circuit when actuated by the upper limit stop 130. The hydraulic circuitry of the present invention is best illustrated by reference to FIG. 11 where it is shown schematically. The hydraulic fluid is supplied from a source such as a tractor hydraulic system represented by hydraulic lines 178, 180 terminating in conventional female couplers 179, 181, respectively. The normal or primary hydraulic circuit of the present invention includes the hydraulic lines 162, 164, and 166. Line 162 is connected to line 178 of the tractor hydraulic system by a male coupler 163 connected into female coupler 179, and the line 164 is connected to the tractor hydraulic system line 180 by a male coupler 165 connected into female coupler 181. In the normal range of operation, the elevator is raised by directing a flow of hydraulic fluid in a direction from line 178 through line 162 and line 166 into port 174 of the hydraulic motor 92, and then outwardly through port 176 of the hydraulic motor, through line 164 and back into the tractor hydraulic system line 180. To lower the elevator in the normal range of operation the flow of hydraulic fluid is simply reversed by appropriate controls in the tractor hydraulic system such that fluid flows in a direction from line 180 through line 164 into port 176 of the hydraulic motor 92 and outwardly through port 174 of the hydraulic motor and through line 166 and line 162 back into the tractor into line 178.

The distribution valve 150 has a first port 154, a second port 156, a third port 158 and a fourth port 160. This valve 150, itself, is not a part of this invention apart from the hydraulic circuit described, therefore, its internal mechanism will not be described. It is sufficient for the purposes of describing the present invention that in the valve's 150 normal position, the first port 154 and second port 156 are in communication with each other, the third port is isolated from the other ports, and fourth port 160 is also isolated from the other ports. When the valve 150 is actuated by a force on cable 140 pulling the valve shaft 152 to the right as oriented in FIG. 11, first port 154 and third port 158 are placed in communication with each other and second port 156 and fourth port 160 are placed in communication with each other. The valve is actuated to this alternative position in the present invention when the upper limit stop 130 is moved to the position shown in FIG. 10 in phantom lines by sheave 112' contacting and moving bumper 132' causing the lever 134' providing a tensile or pulling force on cable 140, one end 141 of which is connected to the valve shaft 152 and the opposite end 142 of which is connected to the distal end of the lever 134. Consequently, when the lever 134 is pushed to the position shown at 134', the distribution valve 150 is actuated to its alternate position initiating the bypass.

A bypass flow circuit is provided by line 170 connected at one end to the port 158 and at the other end into line 164. Consequently, when the valve 150 is actuated to its alternative position in response to contact of the upper end of rear frame member 22 with the upper limit stop 130, the hydraulic fluid is diverted from its normal or primary circuit to the bypass circuit 170. Therefore, when the valve is actuated to the alternative position, the hydraulic fluid flows from line 178 through line 162 into port 154 of the valve 150, and it flows out of the valve 150 through port 158 and through line 170 and line 164 back into line 180 of the tractor hydraulic system, thereby completely bypassing the motor 92, without interrupting a continuous circulating flow of hydraulic fluid through the tractor hydraulic system. Of course, with no fluid flowing through the hydraulic motor 92, the lift apparatus of the elevator will not be activated and the elevator will not be raised beyond the upper limit described.

When the elevator is stopped at this upper limit of its lift range with the upper limit stop holding the valve 150 in its alternate position to bypass fluid around the motor 92, a reverse directed fluid of hydraulic fluid from the tractor hydraulic system would also not be effective to reverse the rotation of the hydraulic motor 92 to lower the elevator because the reverse flow would merely circulate through the bypass circuit 170. Therefore, an alternative flow circuit is provided by line 168 connected at one end to port 160 in valve 150 and at the other end into line 162. A one-way check valve 172 is also positioned in the bypass line 170 to allow hydraulic fluid to flow through the bypass in only one direction. Therefore, when the elevator is positioned at its maximum upper limit of lifting range with the valve actuated in the alternate position, as described above, a reverse flow of hydraulic fluid from the tractor hydraulic system would flow from line 180 through line 164 into the motor 92, and through line 166 into port 156 of valve 150 and out of port 160 of valve 150, through line 168 and line 162 back into the tractor hydraulic system in line 178. Consequently, the motor 92 can operate in reverse even though the valve 150 is actuated to the alternate position, thereby causing the elevator to begin lowering. Of course, as soon as the elevator is lowered sufficiently to remove the upper end of rear frame member 22 from contact with the upper limit stop 130, the valve 150 returns to the normal position and the hydraulic fluid can continue flowing in the reverse direction in the normal or primary circuit through the motor 92, through line 166 into the valve through port 156 and out of the valve through port 154, and through line 162 back into the tractor hydraulic system in line 178 to operate in the normal range of raising and lowering the elevator.

If the elevator is also equipped with a manual winch in addition to the powered winch, such as the manual winch 100 disclosed in this invention, the elevator could also be lowered manually a sufficient amount to remove the upper end of rear frame member 22 from contact with the upper limit stop 130 in order to return the valve 150 to its normal position. In such an embodiment, a simple three-way valve could be substituted for the distribution valve 150 as described above, and the check valve 172 and alternative flow line 168 would not be necessary.

When elevators of the type described herein, particularly the larger sized elevators, are raised to a considerable height to reach the top of a bin, the center of gravity of the elevator is raised significantly and the elevator becomes somewhat more unstable than when it is in its lowered position for storage or transportation. Consequently, it is often desirable to tie or anchor the raised rear end of the elevator to a solid object such as the roof of the bin B to prevent it from tipping in high wind or other adverse conditions. While this practice is laudable from a safety standpoint to prevent the elevator from tipping, such tying-down or anchoring presents another safety hazard when the elevator is equipped with power lift means. For example, if the power lift means is activated into a left mode when the upper end of the elevator is anchored to the bin B, severe structural damage could occur to the elevator or the bin, or the load of the elevator on its carriage assembly 16 could be shifted to an extent to create structural instability and an extreme safety hazard to persons in the vicinity.

To alleviate this provlem, the present invention includes a tie-down limit stop 190 attached under the rear portion of the tube 12 as shown in FIGS. 1, 12, and 13. The tie-down limit stop 190 includes a threaded shaft 198 extending through and slidably mounted in two-apart plates 194, 196 protruding downwardly from a bracket 192 which is fastened to guide tracks 24, 26 under tube 12. It also includes a sheave 216 mounted in a shaft 218 which is journaled in two-apart sleeves 212, 214. The sleeves 212, 214 are immovably retained by two-spaced apart members 208, 210 protruding downwardly from the bracket 192 in rearwardly spaced relation to abuttment plate 196 such that the upper portion of the peripheral surface of the sheave 216 is substantially aligned with the axis of shaft 198. One end 228 of an anchor cable 226 is attached to the rearward end of shaft 198, and the cable 226 extends rearwardly over sheave 216 and depends downwardly. A hook 232 or some other convenient anchoring or attaching means is fastened to the opposite end 230 of anchor cable 226 for fastening the cable 226 to an appropriate immovable anchoring device such as that shown at 234 on the roof of bin B. A connecting cable 220 is attached at one end 222 to the distal end or arm 134 of the upper limit stop 130, see FIGS. 7 and 10, and the opposite end 224 of cable 220 is attached to the forward end of shaft 198. Consequently, when the anchor cable 226 is secured to an appropriate anchor 234, such as the roof of bin B, any significant raising of the rearward end of the elevator will result in anchor cable 226 pulling shaft 198 rearwardly, which in turn, acting through cable 220, pulls arm 134 of the upper limit stop rearwardly to actuate valve 150 to the alternate position resulting in the hydraulic fluid bypassing the motor and precluding any further lifting effort by the powered lift means, as described above.

An adjustable collar 204 is provided on the shaft 198 to limit the rearwardly directed travel of shaft 198 to only an amount sufficient to actuate valve 150, but not enough to apply a full anchoring force on the valve actuator shaft 152. Therefore, if a force begins to lift or tip the elevator, it will only be allowed to move a minimal amount sufficient to pull the shaft 198 a small distance until collar 204 contacts abuttment plate 196, at which time further movement of the elevator will be precluded. In otherwords, the anchoring force, after pulling shaft 198 a minimal distance to actuate the valve 150, is transferred directly from the anchor cable 226 and shaft 198 to the rear portion of the tube 12, rather than being applied in full force directly to the valve 150. Lock nut 206 is provided to retain collar 204 in an appropriate preset position. Also, in order to maintain shaft 198 in the near operable position at all times, a collar 200 with a lock nut 202 are provided which abut against the forward plate 194 of bracket 192.

The invention also includes a first alternative embodiment of the upper limit stop 240 as shown in FIG. 14. Essentially, this alternate embodiment 240 is quite similar to the upper limit stop 130 described above, and it includes a bracket 242, a pivotally mounted lever or arm 244 mounted on bolt 248, and with a spacer 246 maintaining a distance between the lever 244 and bracket 242. Cables 140 and 220 are attached at their respective ends 142, 222, to one end 245 of lever 244.

A weighted body 250 suspended on a rod 252 is pivotally mounted in the bracket 242 on a shaft 256 journaled in a sleeve 254 such that the weighted body is able to swing freely in a plane extending vertically through the longitudinal axis of the tube 12. Since the weighted body 250 always tends to hang below the tube 12 in a vertical line, as the elevator is raised, the acute angle between the rod 252 and the tube 12 becomes smaller. At an angle predetermined to correspond to the maximum desired height to which the elevator is allowed to be lifted, the rod 252 contacts and moves end 243 of lever 244 forwardly causing end 245 of the lever 244 to move rearwardly pulling cable 140 in a rearward direction to actuate the valve 150 to the alternate position for bypassing fluid around the motor 92, as described above in the preferred embodiment.

The invention also includes a second alternative embodiment of an upper limit stop 260 shown in FIGS. 15 and 16, which is really a variation of the first alternative embodiment shown in FIG. 14. The second alternative embodiment 260 also includes a weighted body 272 suspended on a rod 274 below the tube 12 of the elevator. In this embodiment, a socket 278 is attached to a bracket 262 which is fastened to guide tracks 24, 26 on the underside of tube 12. A corresponding ball 276 on the upper end of rod 274 is received and retained in socket 278 in the manner of a ball and socket joint wherein the rod 274 is free to swing in any direction. An end 142 of cable 140 is attached to rod 274 and extends a short distance rearwardly through an eye bolt 270 which is attached to an immovable plate 264 extending downwardly from the bracket 262. The cable 140 then extends from the eye bolt 270 upwardly a short distance and passes over a sheave 268 journaled in a yoke 266 which is also attached to the bracket 262. From the sheave 266, the cable 140 extends forwardly to connect to the actuator shaft 152 of valve 150 as described above in the preferred embodiment. In this embodiment, any substantial movement of the rod 274 with respect to the tube 12 in any plane will result in pulling the cable 140 to actuate the valve 150 to the alternate position to bypass the flow of hydraulic fluid around the hydraulic motor. Therefore, this embodiment is also effective to stop further raising of the elevator not only when it reaches a maximum height but also if it should begin to list or tip sideways during the raising operation.

Since it is often necessary on large elevators to attach them to a tractor or other vehicle to move them into position over a bin or to move them away from the bin prior to lowering the elevator, this invention also includes a jack 280 shown in FIGS. 1 and 17 which can be easily tilted or rotated in relation to the axes of the tube 12 to maintain its leg or strut 282 in substantially vertical position in relation to the ground. The jack includes a convention strut 282 extending upwardly from a base 284 through a driving mechanism 286 operated by a crank 288. However, the jack is mounted in a novel, pivotal mounting bracket 290 by fastening in two ears 291, 293. The pivotal mounting bracket is attached to a frame plate 294 by pivot pin 292. Therefore, the bracket 290 and jack 280 are rotatable with respect to backing plate 294. The backing plate 294 is immovably attached to tube 12 by clamping sleeves 296, and it includes a front guard frame 298 extending around the front of the jack. A plate 300 extends upwardly from the frame guard. A threaded worm or shaft 304 extends through plate 300 into threaded engagement with an internally threaded sleeve or worm follower 306 which is rigidly attached to the top of pivotal bracket 290. The worm 304 also has a crank 302 at one end, and it is retained in longitudinally immovable position in relation to plate 300 by collars 307, 308 and lock nut 309. Consequently, when the crank 302 is turned, the worm 304 turns causing the follower 306 to move longitudinally along the worm 304 resulting in rotating the bracket 290 in relation to the tube 12. Therefore, when the rear end of the elevator is in the lowered position and it is desired to lift the forward end a sufficient height to attach it to a vehicle, the jack can be rotated counterclockwise into a position such that its strut 282 is nearly vertical to the ground. Alternatively, when it is desired to similarly raise the forward end of the elevator when the rear end of the elevator is in the raised position, the jack can be rotated clockwise to again orient the strut 282 in substantially vertical position in relation to the ground.

Although the present invention has been described with a certain degree of particularity, it is understood that the present disclosure has been made by way of example and that changes in detail or structure may be made without departing from the spirit thereof.

What is claimed is:

1. Safety power lift apparatus for machinery, comprising:

reversible hydraulic fluid powered motion producing means for imparting alternate lifting and lowering motion to the machinery, said motion producing means being adapted to respond with motion in one direction when hydraulic fluid is directed therein in one flow direction for lifting the machinery and to respond with motion in the opposite direction when hydraulic fluid is directed therein in a reverse flow direction for lowering the machinery;

a normal hydraulic fluid flow circuit connected to said motion producing means and adapted for conducting required flow of hydraulic fluid in said one direction and in said reverse direction to said motion producing means;

a bypass hydraulic fluid flow circuit adapted to conduct flow of hydraulic fluid past said motion producing means;

valve means in said hydraulic fluid flow circuit adapted to allow hydraulic fluid to circulate in both said one flow direction and in said reverse flow direction in said normal circuit when said valve means is in a normal mode, said valve means also being adapted to divert hydraulic fluid circulating in said one flow direction through said bypass circuit but to prohibit fluid from circulating in said reverse flow direction through said bypass circuit while still allowing fluid to circulate in said reverse flow direction through said normal circuit to said motion producing means when said valve means is in an alternate mode; and valve actuating means that is sensitive to a motion range limit connected to said valve means for actuating said valve to switch from said normal mode to said alternate mode when the motion range limit is reached.

2. The lift apparatus of claim 1, wherein said normal hydraulic fluid flow circuit comprises a first line and a second line, one of said lines for supplying hydraulic fluid from a source to said motion producing apparatus and the other for returning the hydraulic fluid to the source, said valve means comprises a selective valve apparatus with four ports placed in said first line with said first line entering said valve apparatus through the first port and exiting through the second port, the normal mode of said valve apparatus being with said first and second ports in communication with each other and with the third and fourth ports individually isolated and closed, said valve apparatus also being changeable to said alternate mode in which said first port is put in communication with said third port and said second port is put in communication with said fourth port, and including a one-way check valve connected to said third port which allows hydraulic fluid to flow out of said third port from said valve apparatus but which prevents hydraulic fluid from flowing into said third port, said bypass circuit having a bypass line connecting said third port to said second line to allow hydraulic fluid to circulate through said first line and valve means and into said bypass line for return to the source without flowing through and powering said motion producing means when said valve apparatus is in said alternate mode, and an alternate flow line connecting said fourth port to said first line for conducting hydraulic fluid which enters said valve apparatus through said second port after flowing through and driving said motion producing means in a reverse direction and exits said valve apparatus through said fourth port to said first line for return to the source when said valve apparatus is in said alternate mode and said source is causing hydraulic fluid to flow through said circuit in reverse direction.

3. In a height adjustable elevator apparatus that has elongated conveyor means for conveying material and a carriage assembly for supporting said conveyor means including a front frame member and a rear frame member pivotally attached together at their respective bases with the opposite ends of said front and rear frame members being movable toward and away from each other, said conveyor means being positioned on said opposite ends of said front and rear frame members, and a flexible cable attached to said frame members for drawing said opposite ends of said frame members toward each other to raise said conveyor means and for controllably allowing said opposite ends of said frame members to move away from each other to lower said conveyor means, the improvement comprising:

dual alternative reversible drive means, each of which drive means is selectively operable for raising and lowering said conveyor means, the first of said drive means being powered by one power source and being connected to one end of said cable and to said front frame member and operative to draw said cable toward itself and allow the cable to extend out from itself to cause said frame members to move relatively toward and away from each other thereby to raise and lower said conveyor means, and the second of said drive means being powered by another power source and being connected to the opposite end of said cable and also being operative to draw said cable toward itself and allow it to extend out from itself to also cause said frame members to move relatively toward and away from each other thereby to raise and lower said conveyor means.

4. The elevator improvement of claim 3, wherein said first drive means includes a winch that is turned by a hydraulic motor powered by a flow of hydraulic fluid through said hydraulic motor, and said second drive means includes a manual winch turned by a hand operated crank.

5. The elevator improvement of claim 4, wherein said cable is connected to said opposite end of said rear frame member by being passed around a sheave which is attached to said opposite end of said rear frame member, said powered drive hydraulic means is mounted on the front portion of said tube, and said manual drive means is mounted on the front portion of said tube.

6. The elevator improvement of claim 4, including limit stop means for automatically interrupting the power for said hydraulic powered drive means when said rear conveyor reaches a predetermined maximum height.

7. The elevator improvement of claim 4, wherein said manual drive means is mounted on the front portion of said tube and said one end of said cable is connected to said front portion of said tube by attachment to said manual drive means, and said hydraulic powered drive means is mounted on said opposite end of said front frame member and said opposite end of said cable is connected to said opposite end of said rear frame member by attachment to said hydraulic powered drive means.

8. In elevator apparatus having elongated conveyor means for conveying material and a carriage assembly supporting said conveyor means and for raising and lowering one end of said conveyor means, said carriage assembly including a traversing frame member and a fixed frame member, one end of said traversing frame member being pivotally connected to one end of said fixed frame member, the opposite end of said fixed frame member being pivotally connected to the front portion of said conveyor means, the opposite end of said traversing frame member being in longitudinally movable supporting contact with the rearward portion of said conveyor means, and lift means for raising and lowering the rear end of said conveyor means including a winch mounted on the front portion of said conveyor means, and a cable attached at one end to said winch and connected to said opposite end of said traversing frame member, the improvement comprising:

safety controlled drive means for operating said winch, including a hydraulic motor drivingly connected to said winch, which motor is adapted to turn in a forward direction when hydraulic fluid is directed through said motor in one flow direction and to turn in the reverse direction when hydraulic fluid is directed through said motor in the opposite direction, valve means for interrupting the flow of hydraulic fluid to said hydraulic motor, and height sensitive valve actuator means for actuating said valve means when the rear end of said conveyor is raised to a predetermined extent.

9. The elevator improvement of claim 8, wherein said valve means includes a selective valve having four ports therein, the normal position of said valve being with the first and second ports in communication with each other and the third and fourth ports being individually isolated and closed and the alternate position of said valve being with said first and third ports in communication with each other and with said second and fourth ports in communication with each other, said valve means also having a one-way check valve connected to said third port to allow hydraulic fluid to flow out of said third port but not into said third port, said actuator means being connected to said valve to move it from said normal position to said alternate position.

10. The portable grain elevator improvement of claim 9, including first and second hydraulic lines for conducting hydraulic fluid from a pump source through said valve means and said hydraulic motor and back to said source, said source also being capable of supplying the hydraulic fluid in reverse flow direction through said first and second hydraulic lines, said first line being connected to said first port and said second line being connected to said motor, the improvement also including a third line connected at one end to said motor and at its opposite end to said second port, a fourth line connected at one end to said second line and at its opposite end to said third port with said check valve being in the line of flow of said fifth line, and a fifth line connected at one end to said first line and at its opposite end to said fourth port.

11. The elevator improvement of claim 10, wherein said valve actuator means includes a lever mounted on said conveyor means in the path of movement of said rear frame member and being movable in response to contact by said rear frame member, and a first connecting member attached at one end to said valve means and at its opposite end to said lever such that movement of said lever in response to contact by said rear frame member causes said valve to be moved from its normal to its alternate position.

12. The elevator improvement of claim 10, wherein said valve actuator means includes tie-down limit stop means connected to said valve means for simultaneously tying said conveyor means to an anchor and prohibiting said lift means from operating to raise the rear end of said tube beyond the range allowed by said anchor.

13. The elevator improvement of claim 12, wherein said tie-down limit stop means includes a second connecting means connected at one end to said valve means and extending to the rearward portion of said tube then depending downwardly from said tube and having fastening means on its opposite end for fastening said opposite end to an anchor.

14. The elevator improvement of claim 13, wherein said tie-down limit stop means includes force transfer means for allowing sufficient travel of said second connecting member to actuate said valve means then prohibit further travel and transfer the anchoring force directly to the rearward portion of said tube.

15. The elevator improvement of claim 14, wherein said force transfer means includes a bracket attached to the rearward portion of said conveyor means, a rod slidably mounted in said bracket, and a collar on said rod which limits the sliding movement of said rod, said second cable being fastened to said rod such that the travel of said second cable is limited to correspond to the limited sliding movement of said rod.

16. The elevator improvement of claim 15, wherein said collar is longitudinally adjustable on said rod.

17. The elevator improvement of claim 10, wherein said valve actuator means includes a weighted pendulum depending from said conveyor tube, said pendulum being connected to said valve means to cause said valve to move from said normal position to said alternate position in response to relative movement of said pendulum in relation to said tube.

* * * * *